May 11, 1943.    P. WRIGHT    2,319,177
DISCHARGING HOPPER
Original Filed Nov. 22, 1939
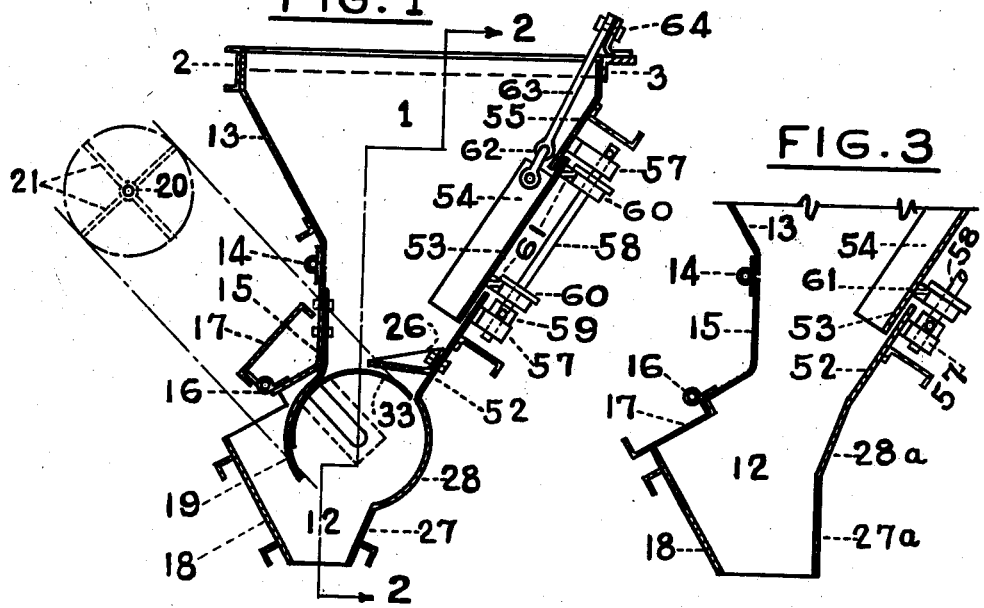
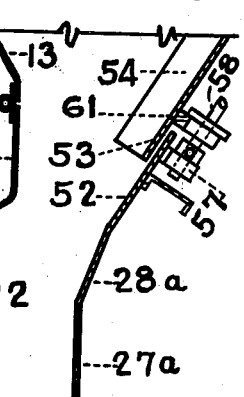
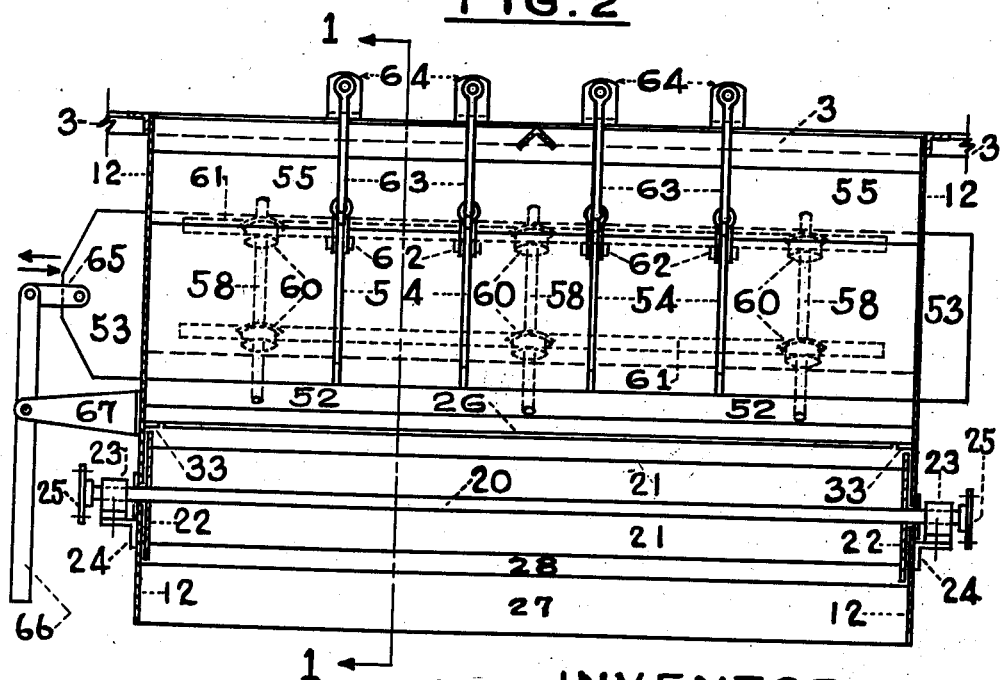
INVENTOR
Paul Wright Patented May 11, 1943

2,319,177

UNITED STATES PATENT OFFICE 2,319,177

DISCHARGING HOPPER

Paul Wright, Birmingham, Ala.

Original application November 22, 1939, Serial No. 305,683. Divided and this application January 18, 1941, Serial No. 374,980

6 Claims. (Cl. 259—39)

This invention relates to hopper constructions used for bulk materials and hoppers for feeders controlling flow of the materials.

This application constitutes a division of my application filed Nov. 22, 1939, Serial 305,683, now Patent No. 2,260,926, dated Oct. 28, 1941.

A general object of this invention is the provision of a hopper that can actuate the movement of the materials so as to relieve or prevent a stoppage of discharge, as often experienced with wood refuse materials.

A further object is the provision of a discharging hopper used in combination with a measuring materials feeder as specified in my application filed Nov. 22, 1939, Serial 305,683, previously mentioned.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which I have illustrated and described preferred embodiments of my invention.

Of the drawing:

Fig. 1 is a vertical transverse section thru a discharging hopper, constructed in accordance with the invention.

Fig. 2 is a longitudinal vertical section in plane 2—2 of Fig. 1. Also the view of Fig. 1 is taken in a plane designated 1—1 in Fig. 2.

Fig. 3 is a view of the end side of the hopper of Fig. 1 modified.

The hopper 1 is supported by members 2 and 3 of any suitable structural type. The hopper 1 is bounded by two ends 12 which may be disposed vertically as shown by Fig. 2 and closed on the upper forward part by a fixed side 13 that extends from the top at member 2 downward to a hinged type joint 14 as indicated in Fig. 1. Suspended from the hinged joint 14, the intermediate forward side comprises two panels also hinge connected, there being an upper panel 15 shaped to join a hinge at 16 and a lower cover panel 17 joined by hinge 16, all in the manner illustrated by Fig. 1. The hinged construction illustrated provides that the intermediate side, made up of panels 15 and 17 hinged at 14 and 16, suspends itself from 14 in a manner to close panel 17 against the lowermost front fixed side 18 of the hopper. In like manner, panels 15 and 17 come in contact with ends 12.

Hoppers with provision for feeding the received materials out of the bottom, frequently experience stoppage in passage of the materials, due to bridging-over, hanging-up or failure of the materials to pass uniformly downward. This is especially true of a hopper constructed with a narrow throat as may be suited to a rotary feeder having much greater length than width. As a means for providing a safe hopper that can actuate the received materials, to cause an effectual passage to the feeder below, my present invention provides a movable side for a feed hopper, as will be understood by reference to Figs. 1 and 2, showing one form of movable side.

In my invention of a movable side, Figs. 1 and 2 illustrate a form, in which 52 is the lower inclined fixed side of hopper 1 as continued from curved part 28. The movable plate 53 laps over plate 52 at the lower side so that materials will not get into the joint and similarly fixed plate 55 extends downward from supporting member 3 to lap over movable plate 53. The movable plate 53 has a transverse movement, operating on rollers and being suspended as shown by Figs. 1 and 2, in which bearings 57 fastened to fixed plates 52 and 55, hold a shaft 58 on which a thrust collar 59 is provided to prevent the shaft from slipping thru the bearings 57. Mounted on the shaft 58 are two flanged rollers 60 that engage and support tracks 61 which are secured to movable side 53 in a manner to have plate 53 clear the lapped plates 52 below and 55 above. Furthermore, to movably hold side 53 so that it may be moved sidewise, it is suspended by clevis and pin connections 62 thru upstanding ribs 54 which are made of bars welded to plate 53 in the spacings shown by Fig. 2. Holding links 63 are connected by pins connected to a fastening 64 as shown. The movable plate 53 projects thru slotted openings in end plates 12, to accommodate full closure of the hopper side when side 53 is moved, as by a lever 66 pivoted at a bracket 67 and joining a link 65, pin connected to the side 53 for movement as shown by the two arrows appearing near link 65. The movement of the side 53 having ribs 54 that engage the materials reposing on same, furnishes a motion transversely that accommodates downward passage or flow of the materials without obstruction. The extent and rapidity of movement of the movable side can be suited to the class of material to be fed. The movement tends further to spread any accumulation of heavier parts that temporarily lodge on shelf 26. This construction is free of engaging joints or connections that lodge accumulations of materials fed.

The combination of the movable side and related shelf over the rotor, provides for temporarily storing a reduced quantity of material above the shelf, and means for releasing said stored material, as in case the hopper is otherwise about empty.

Referring to Fig. 2, the rotating feeder shown with the discharging hopper, comprises a tubular steel shaft 20, to which are secured blades 21, there being four such blades in this illustration. The ends of blades 21 are secured to circular ends 22, thru which shaft 20 projects beyond to be supported in bearings 23. Brackets 24 support bearings 23. Shaft couplings 25 at each end of the rotor shaft, provide for attaching means driving the rotor. A further description of such a feeder may be had from Pat. 2,260,926, dated Oct. 28, 1941.

Having described the hopper and the rotary feeder as both constructed and operated, it is made clear that actuation or movement of the hopper parts is independent of the rotation of the feeder.

I claim:

1. In a feed hopper, a side wall having an oscillatory portion, roller means for supporting said side wall portion, ribs on said side wall portion arranged for engaging materials received in said hopper, and means for oscillating said side wall portion in a direction parallel to the side wall, thereby actuating the discharge of said materials from the hopper.

2. In a hopper having a relatively narrow discharge opening, a closed movable hopper side portion, roller bearing supports for said side portion, and means for actuating the movement of said side portion longitudinally of the hopper, whereby the materials received in said hopper are freely discharged.

3. In a hopper for a rotary feeder, side walls converging downwardly, a side wall section movable lengthwise of the hopper included in one of the side walls, ribs on said movable section projecting into the hopper, and means to oscillate said movable section.

4. In a hopper for a rotary feeder, side walls converging downwardly; a lower hinged section in one of the side walls movable outwardly responsive to pressure of material thereagainst; a section in the opposite side wall movable lengthwise of said wall, and means on the movable section to engage and agitate material in the hopper.

5. In a feed hopper, vertical end walls, side walls converging downwardly to a relatively narrow delivery passage, the side walls being longer than the end walls; a lower hinged section of one side wall forming one side of the delivery passage and movable responsive to the pressure of material thereagainst; a relatively higher section of the other side wall movable lengthwise of said side, means on said latter section to engage and agitate material in the hopper, and means to move said section.

6. In a hopper, a side portion supported by external roller means as comprising a part of said hopper; and said side portion arranged to reciprocate in a direction lengthwise of the hopper, and with provision of a substantial clearance between the movable side portion and the stationary portion of said hopper side.

PAUL WRIGHT.